(12) United States Patent
Mori et al.

(10) Patent No.: US 7,114,587 B2
(45) Date of Patent: Oct. 3, 2006

(54) STRUCTURE OF FRONT PORTION OF VEHICLE BODY

(75) Inventors: Takeshi Mori, Tokyo (JP); Minoru Takagi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/411,294

(22) Filed: Apr. 11, 2003

(65) Prior Publication Data

US 2003/0192727 A1 Oct. 16, 2003

(30) Foreign Application Priority Data

Apr. 11, 2002 (JP) .............................. 2002-109600

(51) Int. Cl.
*B60K 13/02* (2006.01)
(52) U.S. Cl. ................ 180/68.3; 180/68.6; 296/203.02
(58) Field of Classification Search ............... 180/68.1, 180/68.2, 68.3, 68.4, 68.6; 296/193.04, 203.02; 293/113, 115; 123/41.01, 41.48, 41.49, 41.65, 123/41.7
See application file for complete search history.

(56) References Cited

U.S. PATENT DOCUMENTS

| | | | |
|---|---|---|---|
| 4,566,407 A | * | 1/1986 | Peter .................... 123/41.48 |
| 4,938,303 A | | 7/1990 | Schaal et al. |
| 5,036,931 A | * | 8/1991 | Iritani .................... 180/68.1 |
| 5,205,484 A | * | 4/1993 | Susa et al. ............... 123/41.04 |
| 6,186,583 B1 | | 2/2001 | Martin |
| 6,405,819 B1 | * | 6/2002 | Ohkura et al. ............. 180/68.1 |
| 6,622,808 B1 | * | 9/2003 | Sasano et al. ............. 180/68.3 |
| 6,688,424 B1 | * | 2/2004 | Nakada et al. ............. 180/68.1 |
| 2001/0010275 A1 | | 8/2001 | Sasano et al. |
| 2001/0026082 A1 | | 10/2001 | Ozawa et al. |

FOREIGN PATENT DOCUMENTS

| | | |
|---|---|---|
| DE | 198 31 256 A1 | 1/2000 |
| EP | 0 535 406 A1 | 4/1993 |
| EP | 1 216 872 A1 | 6/2002 |
| JP | 2001-080371 A | 3/2001 |
| JP | 2001-213352 A | 8/2001 |

\* cited by examiner

*Primary Examiner*—Hau Phan
(74) *Attorney, Agent, or Firm*—Foley & Lardner LLP

(57) ABSTRACT

A portion between a front end of an air guide plates, which forms an air duct portion, and the front exterior member of the vehicle is sealed by a seal portion. Therefore, hot air leaking from inside of an engine room, is positively prevented from being drawn into the air duct portion after it flows around the front end of the air guide plate.

14 Claims, 9 Drawing Sheets

STRUCTURE OF FRONT PORTION OF VEHICLE BODY

The present disclosure relates to the subject matter contained in Japanese Patent Application No. 2002-109600 filed on Apr. 11, 2002, which is incorporated herein by reference in its entirety.

BACKGROUND OF THE INVENTION

1. [Field of the Invention]

This invention relates to a structure of a front portion of a vehicle body.

2. [Description of the Related Art]

There is known a conventional front portion structure of a vehicle body (as disclosed in JP-A-2001-213352 and JP-A-2001-080371) in which a picture frame-like air duct portion is provided on a front side of a radiator core support member, and cooling air (outside air) can be fed to a heat exchanger of a condenser or a radiator portion through the air duct portion.

The air duct portion is made of a relatively hard synthetic resin, and therefore it is difficult to reduce a gap between the air duct portion and a front exterior member (such as a bumper fascia and a radiator grille), provided on the front side of this air duct portion, to zero.

Therefore, there is a possibility that hot air, leaking from the inside of an engine room through a gap in each of headlamp holding portions of the radiator core support member, flows around each of opposite side portions of the air duct portion, and then is drawn into the air duct portion through a gap between a front end of the side portion and the front exterior member, and again flows into the heat exchanger, so that the cooling efficiency thereof is lowered.

SUMMARY OF THE INVENTION

It is therefore an object of this invention to provide a structure of a front portion of a vehicle body in which hot air, leaking from the inside of an engine room, is positively prevented from being drawn into an air duct portion after it flows around each of opposite side portions of the air duct portion, so that a cooling efficiency of a heat exchanger can be enhanced.

According to a first aspect of the invention, there is provided a structure of a front portion of a vehicle body including: a radiator core support member adapted to mount and support a heat exchanger; a front exterior member exposed to outer side of a front portion of a vehicle; an air duct portion provided between the radiator core member and the front exterior member, and formed in a surrounding manner by an upper cover member, a lower cover member and a pair of air guide plates provided respectively at opposite sides thereof; and a seal portion adapted to seal between a front end of the air guide plates and the front exterior member.

According to the first aspect of the invention, the seal portion forms a seal between the front end of each air guide plates and the front exterior member. Therefore, hot air leaking from the inside of an engine room, is positively prevented from being drawn into the air duct portion after it flows around the front end of the air guide plate. As a result, the cooling efficiency of a heat exchanger can be enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there is shown a preferred embodiment of the invention.

Figure 1:
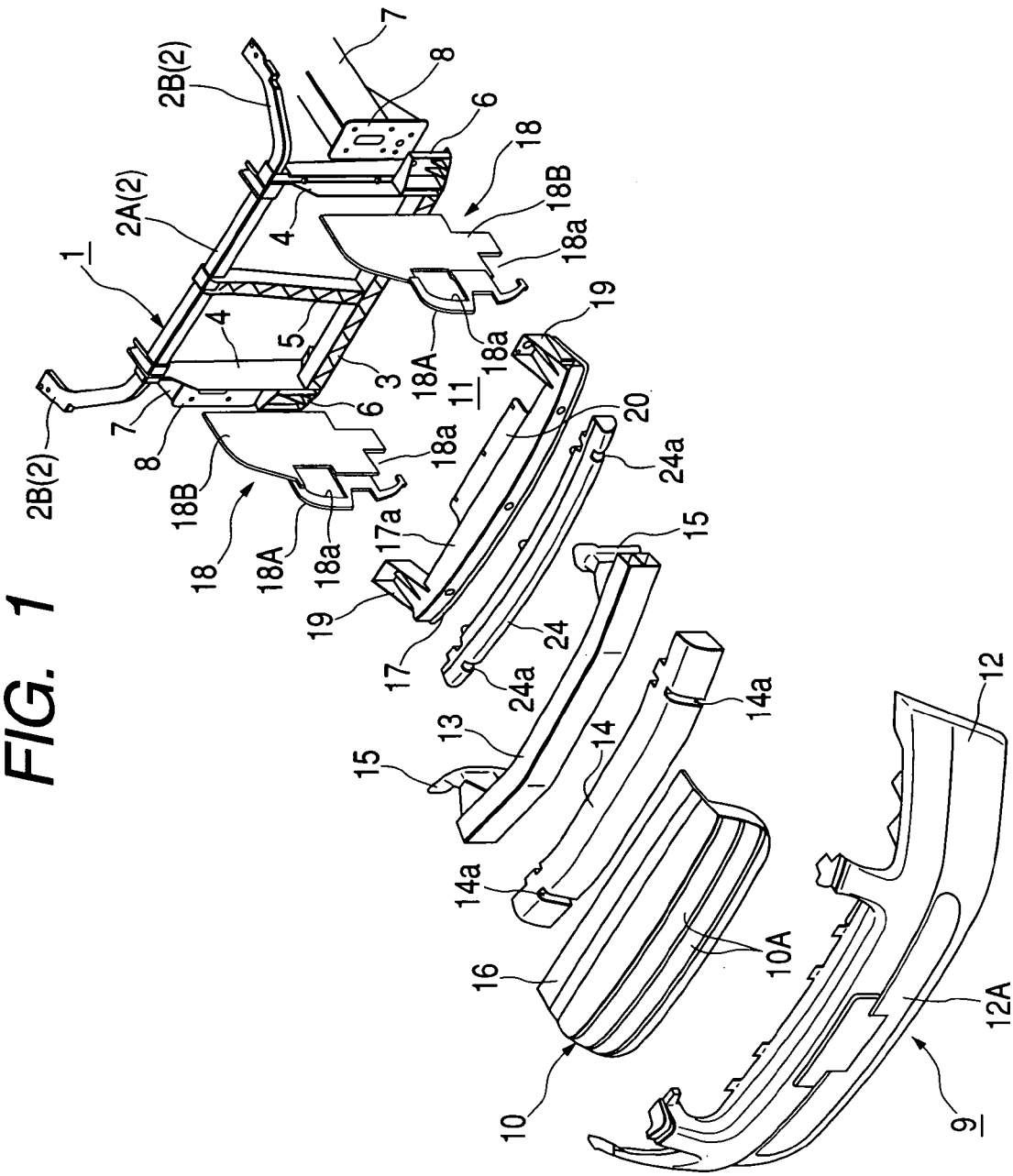
FIG. 1 is an exploded, perspective view of a first embodiment of the present invention.

In FIG. 1, reference numeral 1 denotes a radiator core support member 1 for mounting and supporting a heat exchanger, such as a condenser and a radiator, thereon. The support member 1 includes an upper member 2, a lower member 3, side stay portions 4 provided respectively at opposite (right and left) side portions of the support member 1, and a hood lock stay 5 provided at a central portion of the support member 1. The side stay portions 4 and the hood lock stay 5 interconnect the upper member 2 and lower member 3.

In a first embodiment, the upper member 2 is divided into a center portion 2A and two opposite side portions 2B. Each of the center portion 2A and the side portions 2B is made of light metal such as aluminum. For example, the center portion 2A is extruded to have a rectangular cross-section, and the side portions 2B are fitted and fixedly secured by welding or the like respectively onto opposite end portions of the center portion 2A. Each of a rear end portion of the side portions 2B is connected to a front end portion of a hood ridge member (not shown).

Figure 2:
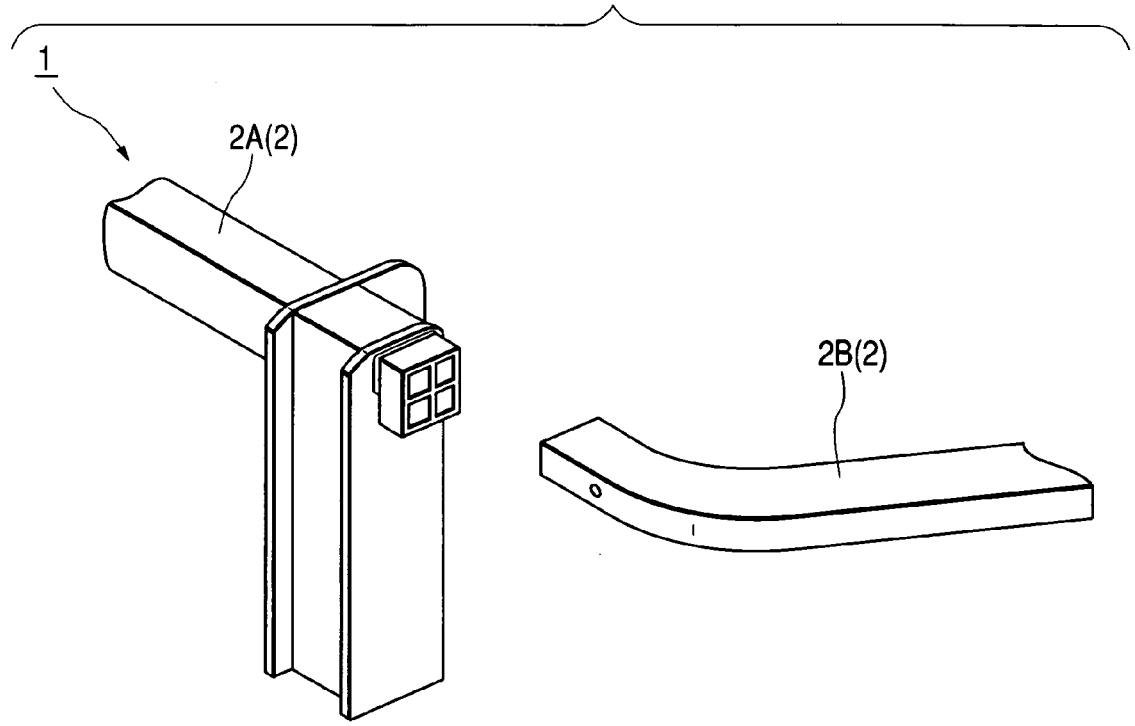
FIG. 2 is an exploded, perspective view showing a side portion of an upper member in the first embodiment of the invention.

The lower member 3, the side stay portions 4 and the hood lock stay 5 are molded into an integral construction, using a suitable synthetic resin. In the first embodiment, these portions are injection molded integrally with the center portion 2A of the upper member 2 in such a manner that upper end portions of the side stay portions 4 and hood lock portion 5 cover an outer peripheral surface of the center portion 2A as shown in FIG. 2.

Figure 3A:
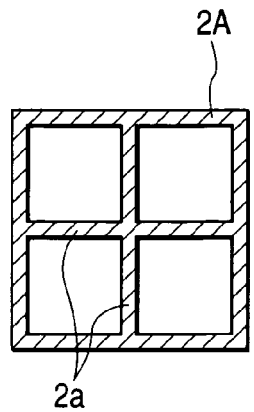
FIGS. 3A and 3B are explanatory cross-sectional views showing a center portion of the upper member in the first embodiment of the invention.
Figure 3B:
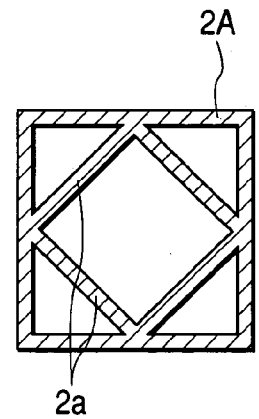

Therefore, reinforcing ribs 2a are formed integrally on an inner surface of the center portion 2A as shown in FIG. 3A or FIG. 3B so that the center portion 2A can withstand a pressure during the injection molding.

As described above, the upper end portion of the radiator core support member 1 is connected to the hood ridge member through the center portion 2A of the upper member 2. Seat portions 6 are formed on the lower portion of the radiator core support member 1. The seat portions 6 are projected respectively from the opposite ends of the lower member, and are mated respectively with seat surfaces 8 formed respectively at front ends of front side members 7. The seat portions 6 are fixedly connected respectively to the seat surfaces 8 by respective bolts and nuts through escape holes formed in a lower cover member (described later) beforehand fixedly secured to the radiator core support member 1.

An air duct portion 11 for introducing the cooling air (outside air) into the heat exchanger is formed between the front side of the radiator core support member 1 and front exterior members such as a front bumper 9 and a radiator grille 10 made of a synthetic resin.

The front bumper 9 includes a bumper fascia 12 made of synthetic resin, a bumper armature 13 made of metal and having a rectangular cross-section, and a damper block member 14 composed of foamed resin and provided between the bumper fascia 12 and the bumper armature 13. Bumper stays 15 are fixedly connected respectively to rear surfaces of right and left end portions of the bumper armature 13 by bolts and nuts. The bumper stays 15 are mated respectively with upper portions of the seat surfaces 8 formed respectively at the front ends of the front side members 7, and are fixedly secured thereto by bolts and nuts.

The air duct portion 11 is an enclosed space portion formed by an upper cover member 16, a lower cover member 17 and air guide plates 18 provided respectively at opposite (right and left) sides thereof.

In the first embodiment, the upper cover member 16 is molded integrally with the radiator grille 10, and extends rearward from an upper edge of the radiator grille 10. The radiator grille 10 is fixedly secured at its lower end to the bumper fascia 12 by clips, and the upper cover member 16 is fixedly secured at its rear end to the center portion 2A of the upper member 2 by clips.

The lower cover member 17 is made of a suitable synthetic resin, and is generally equal in length to the lower member 3. A plurality of rib walls 17b are formed integrally on an inner surface of an upwardly-projecting portion 17a of a rectangular cross-section at predetermined intervals, so that the lower cover member 17 has a required rigidity.

The lower cover member 17 includes bracket portions 19 extending rearward respectively from opposite (right and left) end portions thereof, and an extension portion 20 extending rearward from a rear edge of a central portion thereof. Each bracket portion 19 is beforehand mated with and fixed to a front surface of the corresponding seat portion 6 of the lower member 3. The seat portion 6 is mated with a lower portion of the seat surface 8 of the corresponding front side member 7, and is fixedly secured thereto by the bolt and nut through the escape hole formed in the bracket portion 19, thereby firmly fastening the lower cover member 17 to the front side members 7.

Figure 4:
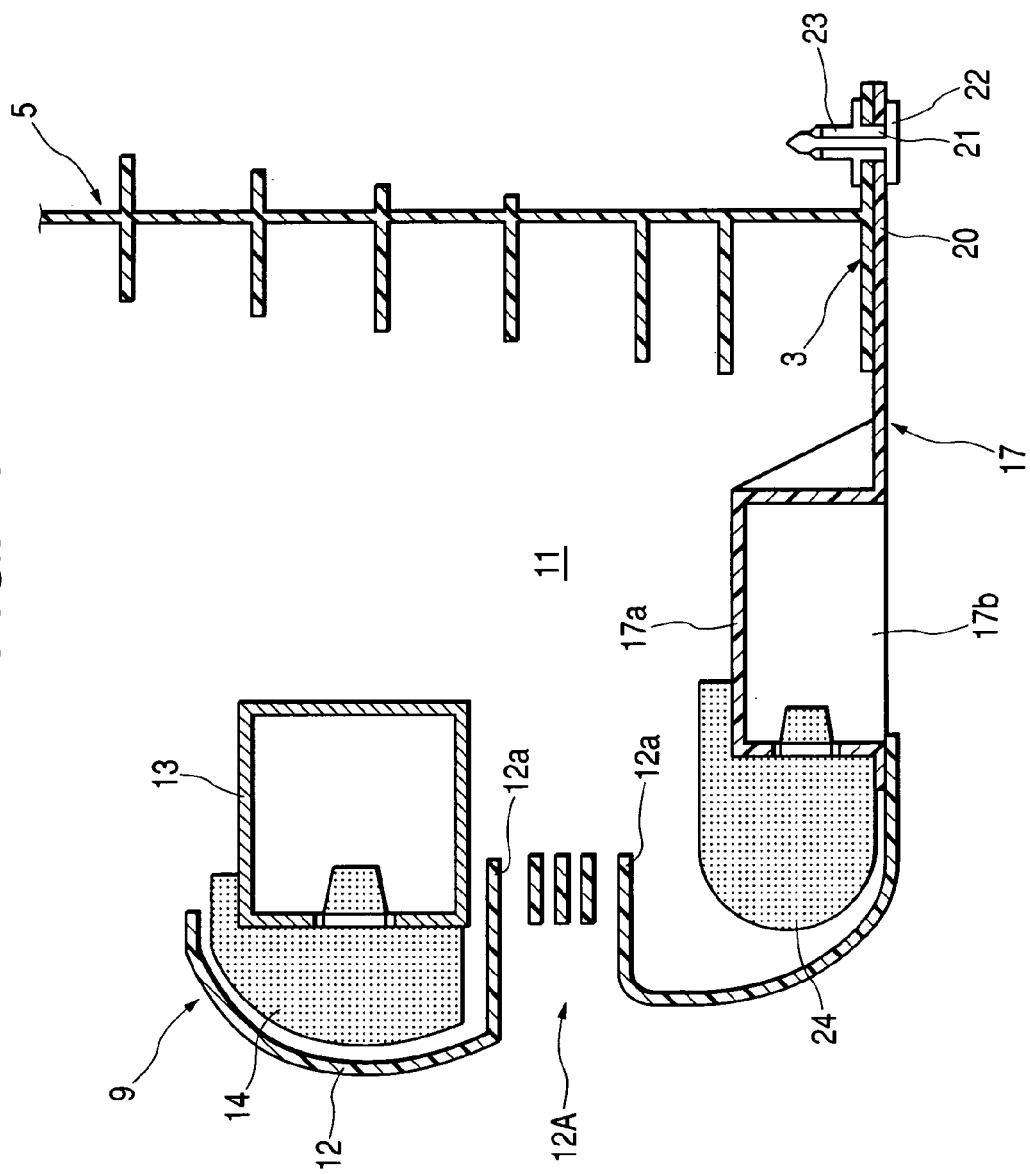
FIG. 4 is an explanatory cross-sectional view of the first embodiment of the invention at a central portion in a direction of a width of a car.

The extension portion 20 is connected at its rear end portion to a lower surface of the lower member 3 in such a manner that this extension portion 20 can be disengaged rearward from the lower member 3 upon application of a collision input from the front side. For example, as shown in FIG. 4, through holes 21 are formed through rear end portions of overlapping portions of the extension portion 20 and the lower wall of the lower member 3. The extension portion 20 and the lower member 3 are connected together by resin clips 22, passing respectively through the through holes 21 from the lower side. Resin clip holders 23 are fitted respectively on the clips 22 from the upper side of the overlapping portions as shown in FIG. 4. When the above collision input acts as a shearing force on the clips 22, the connection between each clip 22 and the corresponding clip holder 23 is broken, so that the extension portion 20 is disengaged rearward from the lower member 3.

In the first embodiment, a damper member 24 is provided on the front side of the lower cover member 17, and is covered with a lower portion of the bumper fascia 12. This bumper member 24 is made, for example, of the same material as that of the resin bumper block 14 provided at the front bumper 9.

Figure 5:
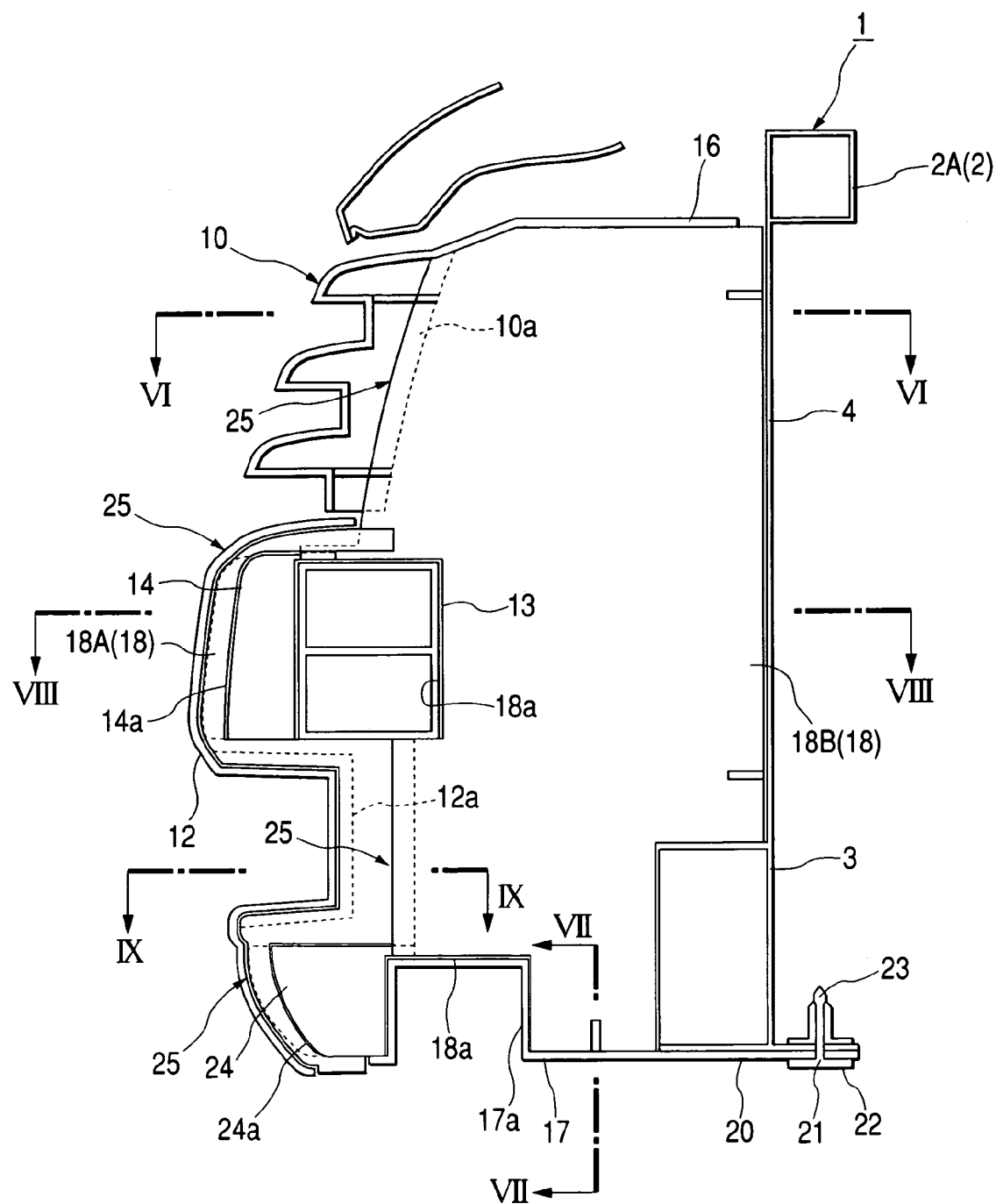
FIG. 5 is an explanatory cross-sectional view of the first embodiment of the invention at an air guide portion.

As shown in FIG. 5, a seal portion 25 is provided between the front end of each air guide plate 18 and each of the front bumper 9 and radiator grille 10 (which are the front exterior members), and this seal portion 25 forms a seal between the air guide plate 18 and each of the front bumper 9 and radiator grille 10.

Each of the air guide plates 18 has notch portions 18a through which the bumper armature 13 and the upwardly-projecting portion 17a of the lower cover member 17 pass, respectively. In the first embodiment, the air guide plate 18 is divided at the notch portions 18a into a front plate 18A and a rear plate 18B.

Figure 6:
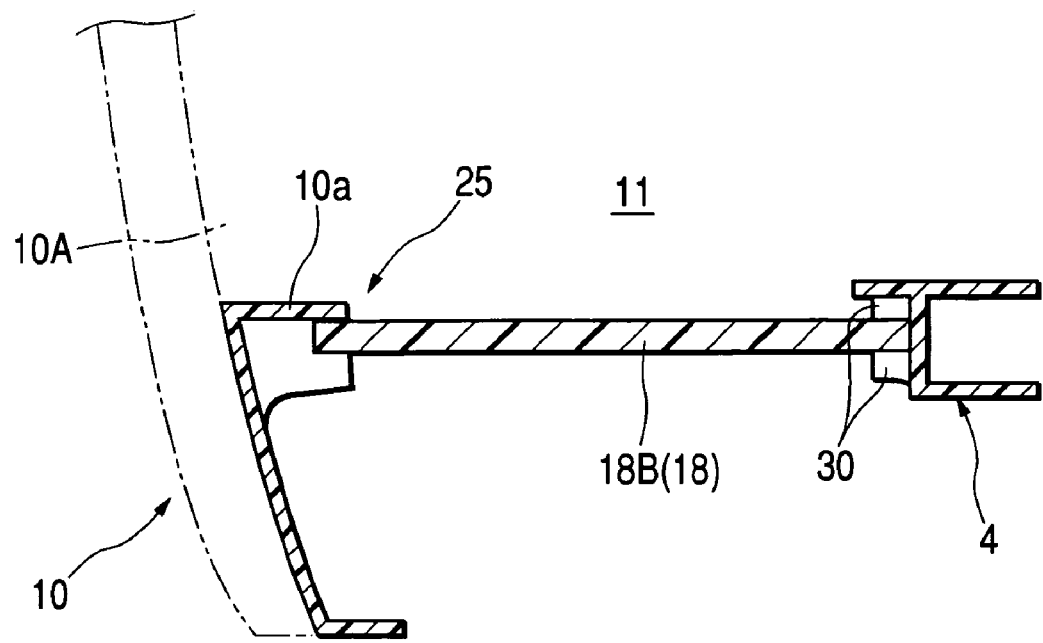
FIG. 6 is a cross-sectional view taken along the line VI—VI of FIG. 5.
Figure 7:
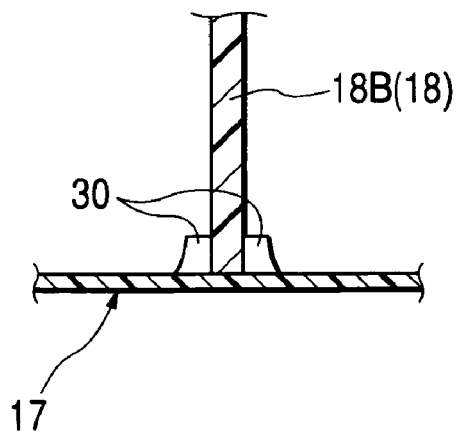
FIG. 7 is a cross-sectional view taken along the line VII—VII of FIG. 5.

Each of the air guide plates 18 is made of a foamed resin material having predetermined hardness such that it has a self shape-retaining ability. For example, a rear edge portion of the rear plate 18B is fixedly held between a pair of projections 30 formed on the front surface of the corresponding side stay portion 4 as shown in FIG. 6, and a lower edge portion of the rear plate 18B is fixedly held between a pair of projections 30 formed on the upper surface of the lower cover member 17 as shown in FIG. 7.

Each front plate 18A is fitted in a corresponding groove 14a, formed in an outer peripheral surface of the resin damper block 14, and a corresponding groove 24a formed in an outer peripheral surface of the resin damper block 24, so that the front plate 18A is positioned in a right-left direction, and is held in position.

Figure 8:
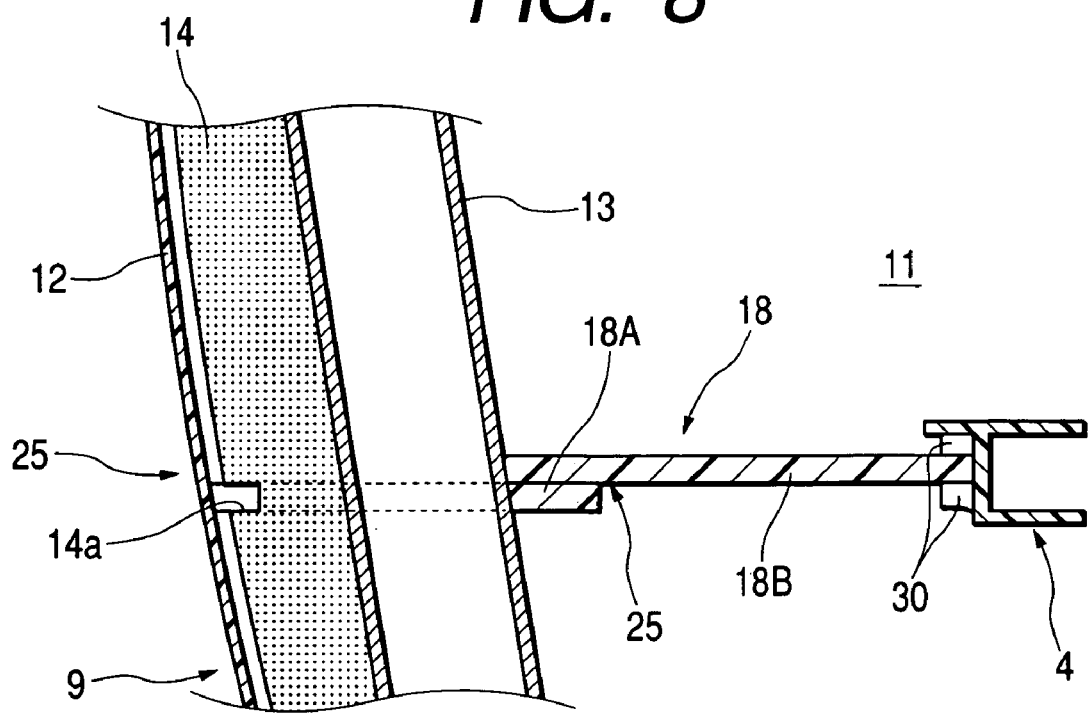
FIG. 8 is a cross-sectional view taken along the line VIII—VIII of FIG. 5.
Figure 9:
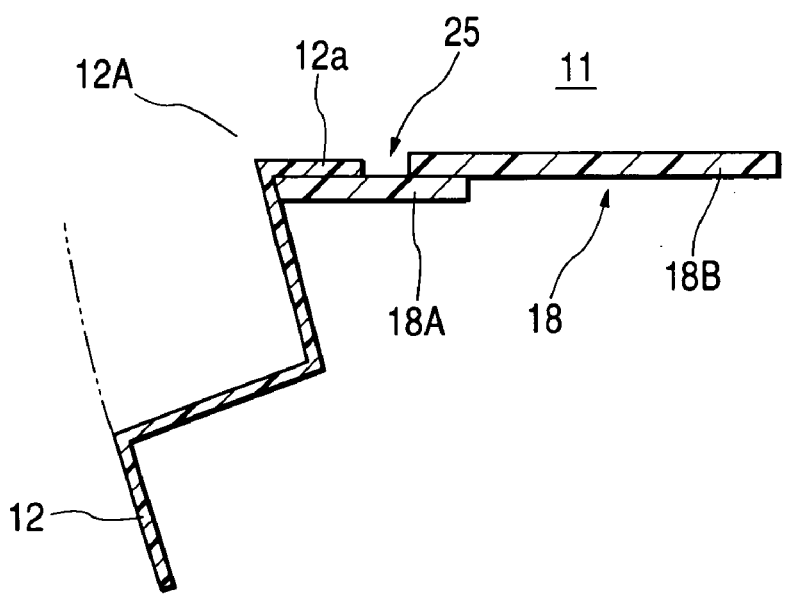
FIG. 9 is a cross-sectional view taken along the line IX—IX of FIG. 5.

The rear end portion of the front plate 18A is held in intimate contact with the front end portion of the rear plate 18B in the right-left direction to form a seal therebetween. For the bumper fascia 12, the front plate 18A is held in intimate contact with a side surface of a flange portion 12a, formed on and projecting rearward from an outer peripheral edge of an air guide portion 12A of the bumper fascia 12, in the right-left direction, and also the front end of the front plate 18A is held in intimate contact with the inner surface of the bumper fascia 12, thereby forming a seal between the front plate 18A and the bumper fascia 12 (see FIGS. 8 and 9). Further, for the radiator grille 10, each rear plate 18B is held in intimate contact with a corresponding flange 10a, formed on a side of an air guide portion 10A of this radiator grille 10, in the right-left direction to form a seal therebetween (see FIG. 6).

Therefore, in the first embodiment, the front plate 18A and the flanges 12a and 10a form sub-plates of the seal portion 25, respectively.

In the above described first embodiment, the seal portion 25 forms a seal between the front end of each air guide plate 18 and each of the front exterior members (including the front bumper 9 and radiator grille 10). Therefore, hot air leaking from the inside of an engine room through a gap in each of headlamp holding portions (not shown) provided respectively at opposite side portions of the radiator core support member 1, is positively prevented from being drawn into the air duct portion 11 after it flows along the side surface of the air guide plate 18 and further around the front end of the air guide plate 18. As a result, the cooling efficiency of the heat exchanger can be enhanced.

In the first embodiment, each of the air guide plates 18 is divided into the front plate 18A and the rear plate 18B, and the front plate 18A is fitted in the grooves 14a and 24a formed respectively in the outer peripheral surfaces of the resin damper blocks 14 and 24 provided in the bumper fascia 12. Therefore, by adjusting the position of the front plate 18A, fitted in the grooves 14a and 24a, in the forward-rearward direction, a dimensional error between the front plate 18A and the inner surface of the bumper fascia 12 can be absorbed, so that the sealing effect can be enhanced.

Also, each of the air guide plates 18 is made of the foamed resin material, and therefore a lightweight design can be achieved while securing a predetermined surface rigidity which will not adversely affect the air guide function. The air guide plate 18 can be easily broken upon application of a collision input, and therefore when a light collision occurs, the air guide plates 18 are broken, thereby preventing the radiator core support member 1 from being deformed or broken under pressure.

Furthermore, the lower cover member 17 is made of the synthetic resin, and the lower cover member 17 is connected at the rear end of its central portion to the lower member 3 of the radiator core support member 1 in such a manner that this central portion can be disengaged rearward from the lower member 3 upon application of a frontal collision input. Therefore, the central portion of the lower cover member 17 is disengaged and moved rearward at the time of a light collision, thereby preventing the radiator core support member 1 from being deformed or broken under pressure. In the event of a collision with a pedestrian, since the central portion of the lower cover member 17 is disengaged and moved rearward, and since the resin damper block 24, serving as a shock-absorbing member, is provided on the front side of this lower cover member 17, the degree of injury of the legs of the pedestrian can be decreased.

Figure 10:
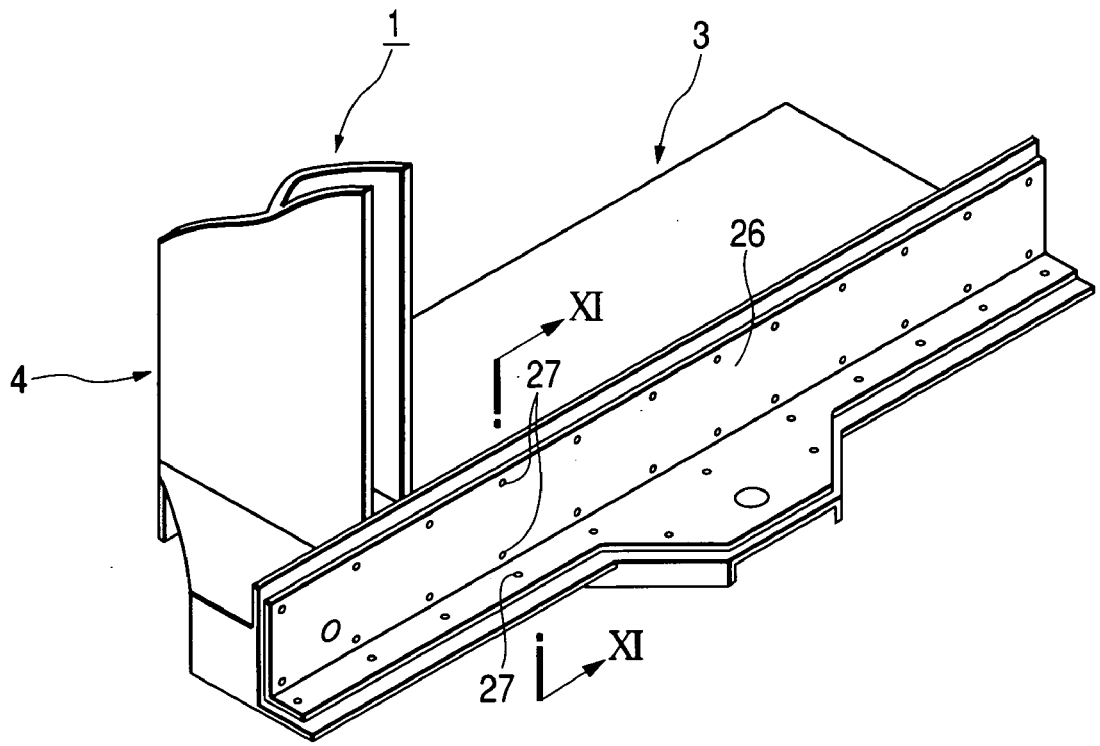
FIG. 10 is a perspective view showing a rear side of a modified lower member.
Figure 11:
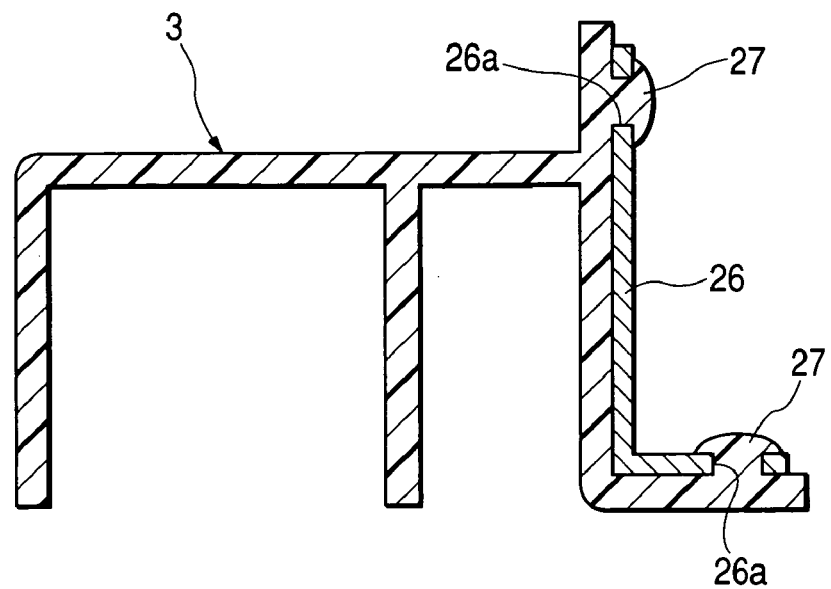
FIG. 11 is a cross-sectional view taken along the line XI—XI of FIG. 10.

As shown in FIGS. 10 and 11, the lower member 3 can be injection molded in such a manner that a metal plate 26 of a generally L-shaped cross-section is integrally formed on and extends along the rear surface of this lower member 3 for reinforcing purposes. In this case, preferably, a plurality of through holes 26a are formed through the metal plate 26, and a resin material passes through these through holes 26a to form resin anchor portions 27 on the reverse side of this metal plate 26, thereby increasing the strength of interlocking connection between the lower member 3 and the metal plate 26.

Figure 12:
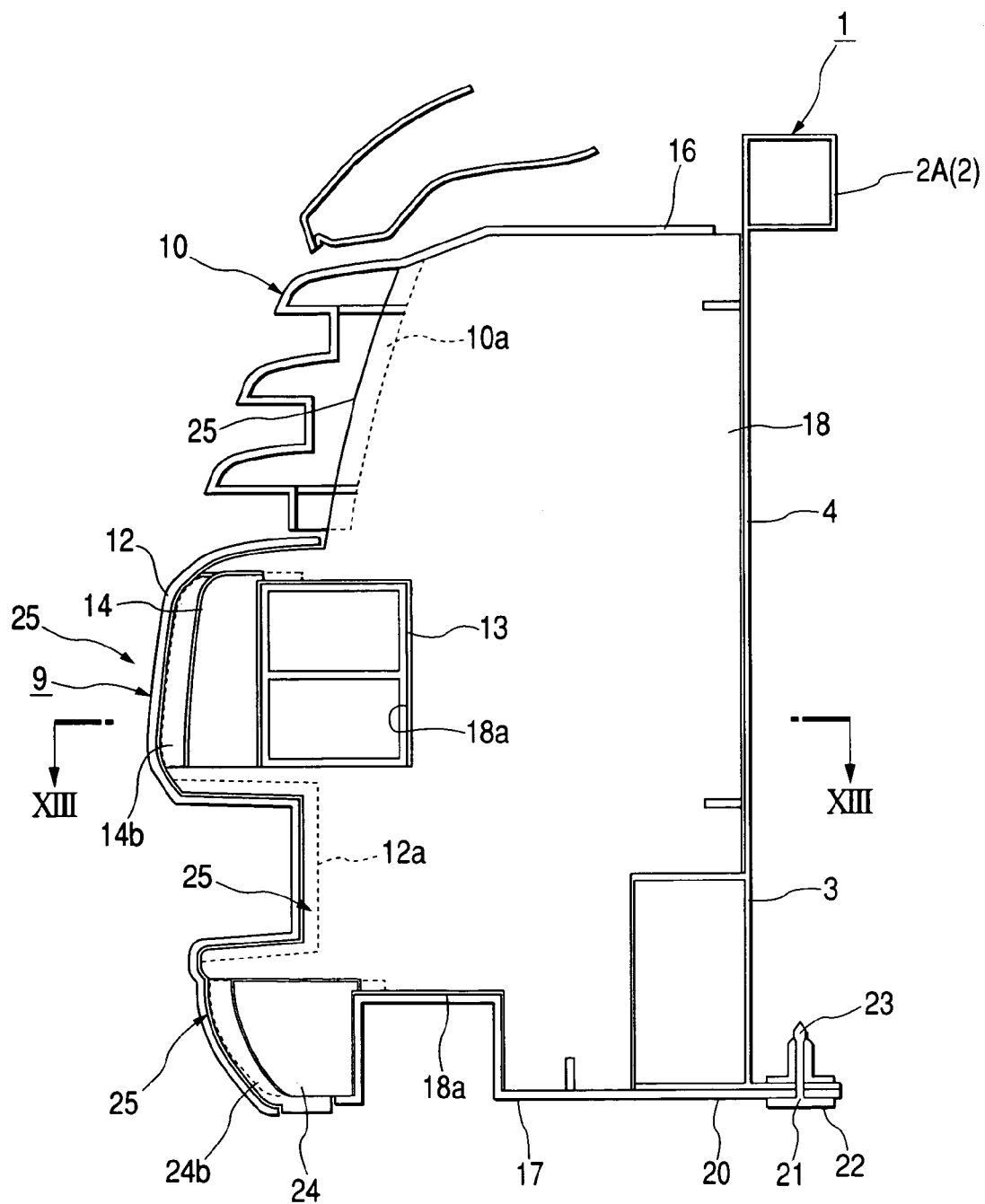
FIG. 12 is an explanatory cross-sectional view similar to FIG. 5, but showing a second embodiment of the invention.
Figure 13:
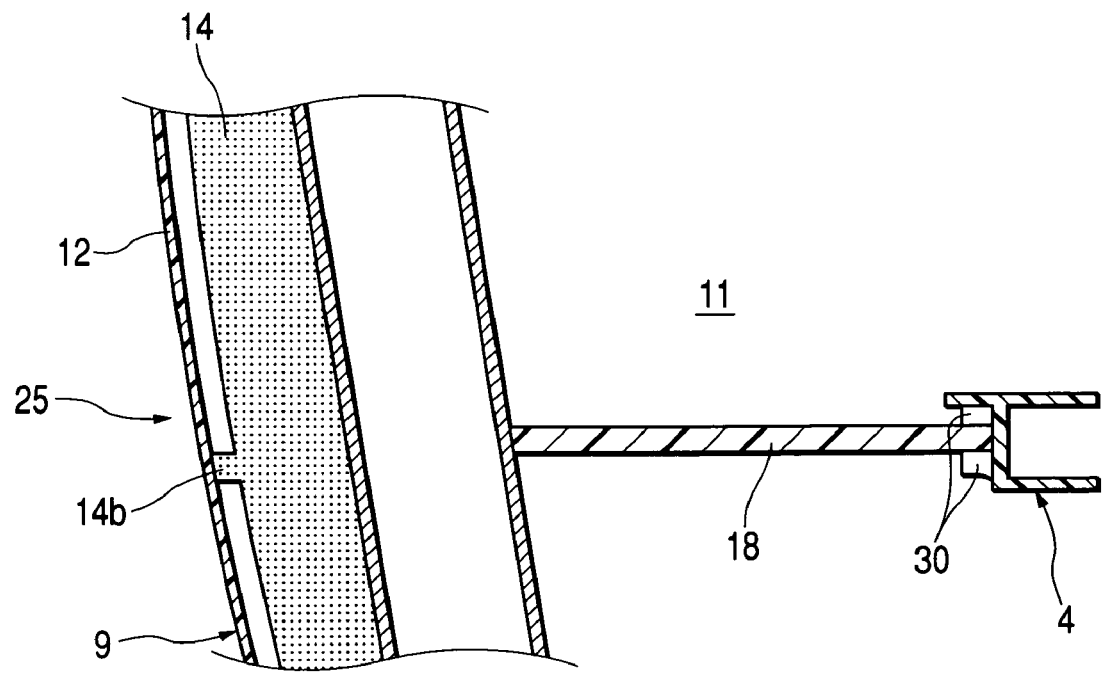
FIG. 13 is a cross-sectional view taken along the line XIII—XIII of FIG. 12.

FIGS. 12 and 13 show a second embodiment of the invention. In the second embodiment, each of air guide plates 18 is not divided into two sections (that is, front and rear sections) as in the first embodiment, but is formed as a single plate. An upper notch portion 18a is formed such that a bumper armature 13 and a resin damper block 14 can be fitted into this notch portion 18a from a rear side thereof. A front end edge portion of this air guide plate is held in intimate contact with upper and inner surfaces of a receiving portion (formed in a bumper fascia 12 so as to receive the resin damper block 14) and side surfaces of flanges 12a and 10a of air guide portions 12A and 10A to thereby form a sealing portion 25. Further, ridges 14b and 24b, extending in an upward-downward direction, are formed on front sides of resin damper blocks 14 and 24, respectively, and these ridges 14b and 24b are held in intimate contact with an inner surface of the bumper fascia 12 to form seal portions 25, respectively.

Therefore, in the second embodiment, generally similar effects to those of the first embodiment can be obtained, and a so-called blow-back (that is, a phenomenon in which hot air from the engine room flows around the air duct portion 11, and then is drawn into this air duct portion 11) can be avoided.

Figure 14:
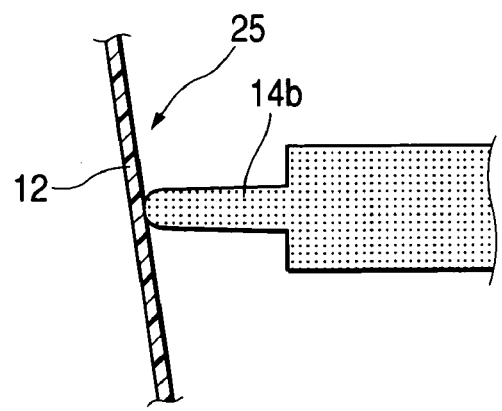
FIG. 14 is an explanatory cross-sectional view showing a modified example of a ridge shown in FIG. 13.

As shown in FIG. 14, an outer edge of each of the ridges 14b and 24b may be tapering so that this outer edge can be deformed to be conformed in shape to the inner surface of the bumper fascia 12 with a pressure of contact therewith so as to enhance the degree of intimate contact therebetween.

In the first and second embodiments, although the damper member 24, covered with the lower portion of the bumper fascia 12, is made of the same material as that of the resin damper block 14 in the front bumper 9, the damper member 24 maybe replaced by a resin spring provided along the front surface of the lower cover member 17.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A structure of a front portion of a vehicle body comprising:
   a radiator core support member adapted to mount and support a heat exchanger;
   a front exterior member exposed to outer side of said front portion of said vehicle;
   an air duct portion provided between the radiator core member and the front exterior member, and formed in a surrounding manner by an upper cover member, a lower cover member and a pair of air guide plates provided respectively at opposite sides thereof; and
   a seal portion that seals between a front end of the air guide plates and the front exterior member, wherein the seal portion is present between a bumper fascia and a bumper armature.

2. The structure as claimed in claim 1,
   wherein the seal portion is formed by a sub-plate separate from the air guide plate.

3. The structure as claimed in claim 1,
   wherein the air guide plate is made of a foamed resin material.

4. The structure as claimed in claim 1,
   wherein the seal portion is made of a foamed resin material.

5. The structure as claimed in claim 1,
   wherein the lower cover member is made of a synthetic resin.

6. The structure as claimed in claim 1, further comprising:
   a damper member mounted between the front exterior member and a front side of the lower cover member.

7. The structure as claimed in claim 1, wherein the seal portion adapted to seal between a front end of the air guide plates and the front exterior member seals a gap between respective front ends of the air guide plates and the front exterior member.

8. The structure as claimed in claim 1, wherein the seal portion is present between the bumper fascia and a resin damper block in front of the bumper armature.

9. The structure as claimed in claim 1, wherein the seal portion seals a gap between the bumper fascia and the bumper armature.

10. The structure as claimed in claim 9, wherein the seal portion seals a gap between the bumper fascia and the resin damper block in front of the bumper armature.

11. The structure as claimed in claim 1, wherein the seal portion is present between a radiator grille and the front ends of the air guide plates.

12. The structure as claimed in claim 11, wherein the seal portion seals a gap between the radiator grille and the front ends of the air guide plates.

13. A structure of a front portion of a vehicle body comprising:
   a radiator core support member adapted to mount and support a heat exchanger;
   a front exterior member exposed to outer side of said front portion of said vehicle;
   an air duct portion provided between the radiator core member and the front exterior member, and formed in a surrounding manner by an upper cover member, a lower cover member and a pair of air guide plates provided respectively at opposite sides thereof;
   a seal portion that seals between a front end of the air guide plates and the front exterior member; and
   a resin damper block member mounted on an inner side of the front exterior member,
   wherein the seal portion is formed by a ridge formed on and projects from the resin damper block member, and held in intimate contact with an inner surface of the front exterior member.

14. A structure of a front portion of a vehicle body comprising:
   a radiator core support member adapted to mount and support a heat exchanger;
   a front exterior member exposed to outer side of said front portion of said vehicle;
   an air duct portion provided between the radiator core member and the front exterior member, and formed in a surrounding manner by an upper cover member, a lower cover member and a pair of air guide plates provided respectively at opposite sides thereof;
   a seal portion that seals between a front end of the air guide plates and the front exterior member;
   a pair of side members connected to opposite lower corners of the radiator core support member, respectively; and
   a lower structural member attached to a lower portion of the radiator core support member,
   wherein the lower cover member is connected to each of a front ends of the side member at right and left end portions thereof, respectively, and is connected to the lower structural member at a central portion thereof in such a manner that the central portion can be disengaged rearward from the lower structural member upon application of a collision input from a front side of the vehicle.

* * * * *